US012756176B2

(12) United States Patent
Kobayashi et al.

(10) Patent No.: US 12,756,176 B2
(45) Date of Patent: Oct. 6, 2026

(54) POWER GENERATION DEVICE

(71) Applicants: IHI CORPORATION, Tokyo (JP); THE RITSUMEIKAN TRUST, Kyoto (JP)

(72) Inventors: Toshikazu Kobayashi, Tokyo (JP); Hirotaka Sugawara, Tokyo (JP); Yoshitaka Kawabata, Shiga (JP)

(73) Assignees: IHI CORPORATION, Tokyo (JP); THE RITSUMEIKAN TRUST, Kyoto (JP)

(*) Notice: Subject to any disclaimer, the term of this patent is extended or adjusted under 35 U.S.C. 154(b) by 164 days.

(21) Appl. No.: 18/910,136

(22) Filed: Oct. 9, 2024

(65) Prior Publication Data

US 2025/0047093 A1 Feb. 6, 2025

Related U.S. Application Data

(63) Continuation of application No. PCT/JP2023/010051, filed on Mar. 15, 2023.

(30) Foreign Application Priority Data

Apr. 15, 2022 (JP) ................................ 2022-067486

(51) Int. Cl.
*H02H 7/06* (2006.01)
*H02H 1/00* (2006.01)

(52) U.S. Cl.
CPC ............ *H02H 7/06* (2013.01); *H02H 1/0007* (2013.01)

(58) Field of Classification Search
CPC ............................... H02H 7/06; H02H 1/0007
See application file for complete search history.

(56) References Cited

U.S. PATENT DOCUMENTS 7,276,871 B2 * 10/2007 Ganev ..................... H02P 9/006 318/434
9,362,735 B2 * 6/2016 Cypers .................... B60L 50/51
(Continued)

FOREIGN PATENT DOCUMENTS

EP 2 144 345 B1 3/2011
JP 2012-120408 A 6/2012
(Continued)

OTHER PUBLICATIONS

Extended European Search Report issued Oct. 23, 2025 in European Patent Application No. 23788109.9, 6 pages.
(Continued)

*Primary Examiner* — Scott Bauer
(74) *Attorney, Agent, or Firm* — Oblon, McClelland, Maier & Neustadt, L.L.P.

(57) ABSTRACT

A power generation device includes: a power generator, a power conversion circuit, a first interruption circuit, a second interruption circuit, a first monitoring circuit which monitors an output current from the power generator to the power conversion circuit and outputs a first interruption signal when an absolute value of the output current exceeds a first predetermined value, and a second monitoring circuit which monitors a total value of output voltages of respective phases of the power generator and outputs a second interruption signal when an absolute value of the total value exceeds a second predetermined value. The first interruption circuit interrupts a connection between the power generator and the power conversion circuit in accordance with the output of the first or second interruption signal. The second interruption circuit interrupts a connection between three-phase coils and the neutral point in accordance with the output of the first or second interruption signal.

4 Claims, 6 Drawing Sheets

(56) References Cited

U.S. PATENT DOCUMENTS

| | | | | |
|---|---|---|---|---|
| 12,081,015 | B2 * | 9/2024 | Ives | H02H 7/0851 |
| 2006/0022623 | A1 * | 2/2006 | Inaba | H02P 6/185 318/400.02 |
| 2007/0030606 | A1 | 2/2007 | Ganev et al. | |
| 2012/0306462 | A1 | 12/2012 | Oyori et al. | |
| 2018/0019687 | A1 * | 1/2018 | Taniguchi | H02M 7/5387 |
| 2021/0257948 | A1 * | 8/2021 | Toyodome | H02P 25/184 |

FOREIGN PATENT DOCUMENTS

| | | | |
|---|---|---|---|
| JP | 2016-123222 | A | 7/2016 |
| WO | WO-2015/136976 | A1 | 9/2015 |
| WO | WO 2016/180479 | A1 | 11/2016 |

OTHER PUBLICATIONS

Japanese Office Action issued Oct. 21, 2025 in Japanese Patent Application No. 2024-514860, 4 pages.

International Search Report issued Apr. 25, 2023 in PCT/JP2023/010051 filed on Mar. 15, 2023, 2 pages.

* cited by examiner

POWER GENERATION DEVICE

CROSS REFERENCE TO RELATED APPLICATIONS

This application is a continuation application of International Application NO. PCT/JP2023/010051, now WO 2023/199687 A1, filed on Mar. 15, 2023, which claims priority to Japanese Patent Application No. 2022-067486, filed on Apr. 15, 2022, the entire contents of which are incorporated by reference herein.

TECHNICAL FIELD

The present disclosure relates to a power generation device with a rotating magnetic field.

BACKGROUND ART

A permanent magnet generator includes a stator having coils of phases and a rotor as a field system having permanent magnets. The permanent magnets are arranged in the rotating direction of the rotor while alternately changing their polarities. The permanent magnets of the rotor always generate a magnetic flux crossing the coils of the stator. Therefore, in principle, the permanent magnet generator continues power generation as long as the rotor rotates. That is, the permanent magnet generator continues power generation even if a fault such as a short circuit occurs in the power generator. In this regard, US 2007/0030606 A discloses a protection circuit for stopping power supply from the power generator.

SUMMARY OF THE INVENTION

As described above, since the rotor of the permanent magnet generator constantly generates magnetic flux, the power generation cannot be stopped while the rotor is rotating. Therefore, when a short circuit occurs inside the power generator, there is a concern that damage to the power generator or related equipment connected to the subsequent stage thereof may progress excessively.

The present disclosure has been made in view of the above circumstances, and it is an object of the present disclosure to provide a power generation device capable of preventing damage caused by a short circuit occurring inside the power generator from progressing.

A power generation device according to one aspect of the present disclosure includes: a power generator provided with a stator including three-phase coils; a power conversion circuit configured to convert an AC power output from the power generator into a DC power; a first interruption circuit provided between an output of the power generator and an input of the power conversion circuit; a second interruption circuit provided between the three-phase coils and a neutral point; a first monitoring circuit configured to monitor an output current flowing from the power generator to the power conversion circuit and output a first interruption signal when an absolute value of the output current exceeds a first predetermined value; and a second monitoring circuit configured to monitor a total value of output voltages of respective phases of the power generator and outputting a second interruption signal when an absolute value of the total value exceeds a second predetermined value. The first interruption circuit electrically interrupts a connection between the power generator and the power conversion circuit in accordance with an output of the first interruption signal or the second interruption signal; the second interruption circuit electrically interrupts a connection between the three-phase coils and the neutral point in accordance with the output of the first interruption signal or the second interruption signal.

The first monitoring circuit may be configured to monitor a voltage corresponding to the output current obtained by a current sensor provided between an output of the power generator and an input of the power conversion circuit as monitoring the output current. The power conversion circuit may include a pair of switching elements functioning as rectifying elements in each phase; and the first monitoring circuit may be configured to monitor a voltage of each of the pair of switching elements as monitoring the output current. The power generator may be a permanent magnet synchronous generator.

According to the present disclosure, it is possible to provide a power generation device capable of preventing damage caused by a short circuit occurring in a power generator from progressing.

DESCRIPTION OF EMBODIMENTS

Figure 1:
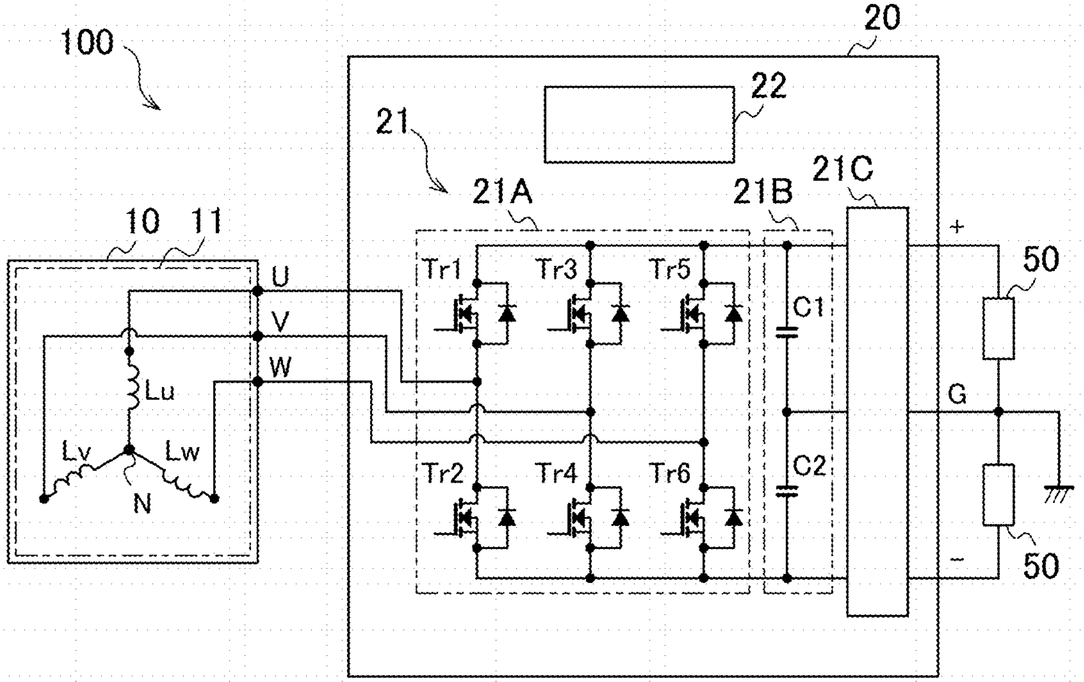
FIG. 1 is a diagram showing an example of a configuration of a power generation device.

Hereinafter, a power generation device 1 according to some embodiments of the present disclosure will be described. It should be noted that the same reference numerals are given to the common parts in the respective figures, and duplicated description thereof will be omitted.

First, phenomena when a short circuit occurs in a configuration in which the power generation device 1 does not have the protection circuit according to the present embodiment will be described. FIG. 1 is a diagram showing an example of a configuration of the power generation device 100 in which the protection circuit according to the present embodiment is omitted from a configuration of the power generation device 1. As shown in FIG. 1, the power generation device 100 includes a power generator 10 and a power converter 20. The power converter 20 includes a power conversion circuit (converter circuit) 21 and a controller 22. However, the power generation device 100 does not have a first interruption circuit 23, a second interruption circuit 24, a first monitoring circuit 25 and a second monitoring circuit 26 (see FIGS. 5 to 9) which are protection circuits according to the present embodiment described later.

The power generator 10 includes a rotor (not shown) as a field system and a stator 11 including three-phase coils. The power generator 10 generates and outputs three-phase AC currents by rotation of the rotor. The power generator 10 is, for example, a permanent magnet synchronous generator. In this case, the rotor has permanent magnets disposed in a rotational direction of the rotor. The permanent magnets are arranged in the rotational direction with alternating polarities. The rotor is connected to a rotary shaft of a drive source (not shown) such as a turbine, an electric motor, or the like.

The stator 11 includes a core (not shown) and three-phase coils wound around teeth (not shown) of the core. The three-phase coils are configured of a U-phase coil Lu, a V-phase coil Lv, and a W-phase coil Lw. One end of each coil functions as an output terminal of the power generator 10, and the other end of each coil is connected to each other at a neutral point N. That is, the coil Lu, the coil Lv, and the coil Lw are connected by a so-called star connection. Each coil may be constituted from a plurality of coils connected in parallel or in series.

The power conversion circuit 21 converts an AC power output from the power generator 10 into a DC power. The power conversion circuit 21 outputs DC voltages of positive polarity and negative polarity. The power conversion circuit 21 includes a switching circuit 21A, a smoothing circuit 21B, and a filter circuit 21C. The switching circuit 21A includes a pair of switching elements functioning as rectifying elements in each phase. That is, the switching circuit 21A includes a pair of switching elements Tr1 and Tr2 provided for the U phase, a pair of switching elements Tr3 and Tr4 provided for the V phase, and a pair of switching elements Tr5 and Tr6 provided for the W phase. Each switching element is a power semiconductor such as a MOSFET, a thyristor, an IGBT, or the like. The ON/OFF state of each switching element is controlled by the controller 22 so that a desired output voltage is finally obtained.

The smoothing circuit 21B has a known configuration including a pair of capacitors (DC link capacitors) C1 and C2 connected in series. The smoothing circuit 21B smooths the positive and negative pulse currents output from the switching circuit 21A. A point between the capacitors C1 and C2 is set at a ground potential and connected to the ground terminal G.

The filter circuit 21C has a known configuration including an inductor (not shown) and the like. The filter circuit 21C outputs a DC power of the voltage set by the controller 22 while removing common mode noise and normal mode noise. For example, each load 50 is connected between the positive output (+) of the filter circuit 21C and the ground terminal G, and between the negative output (−) and the ground terminal G.

The controller 22 controls the operation of the entire power generation device 100. For example, the controller 22 performs the output control of a gate signal to the switching circuit 21A, the feedback control for stabilizing the output voltage, and acquisition of measurement values of various sensors (not shown). The controller 22 may be configured as a computer, for example.

Next, a short circuit occurred in the power generator 10 will be described. As the short circuit in the power generator 10, three types of short circuits with different paths can be considered. These three types of short circuits are an interturn short circuit, a phase-to-phase short circuit, and a grounding fault.

(Interturn Short Circuit)

Figure 2:
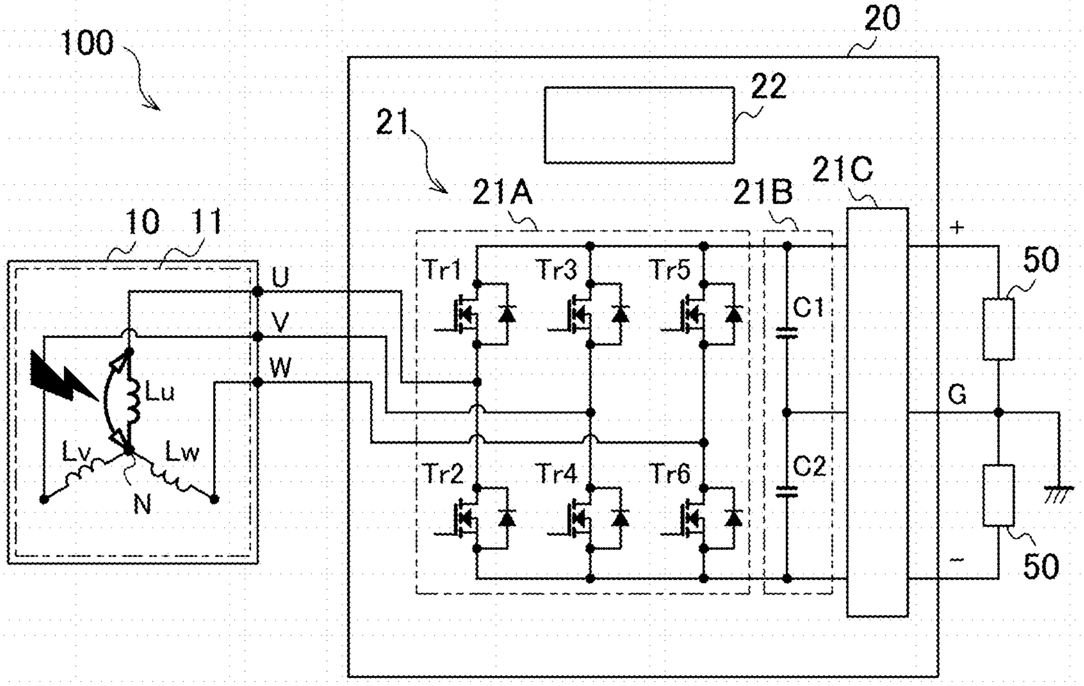
FIG. 2 is a diagram showing an example of an interturn short circuit in the power generation device shown in FIG. 1.

FIG. 2 is a diagram showing an example of an interturn short circuit in the power generation device 100 shown in FIG. 1. The interturn short circuit in the power generator 10 is a short circuit that occurs between two points in the conductive path of one phase. FIG. 2 shows, as the example, a short circuit that occurs between two points in the U-phase coil Lu. This short circuit shortens the length of the coil that crosses the magnetic flux, so that the output voltage of the U-phase decreases.

The controller 22 controls the switching circuit 21A to maintain the output voltage during the normal operation. For example, the controller 22 measures the output voltage from the filter circuit 21C, and controls ON/OFF of the switching elements Tr1 to Tr6 based on the measured value. When the output voltage of the U-phase decreases under such control, the controller 22 extends the ON time of the switching elements Tr1 and Tr2 to increase the output current of the U-phase. In this case, there is a possibility that heating will progress at least at the short-circuit location due to the increase in the output current.

(Phase-to-Phase Short Circuit)

Figure 3A:
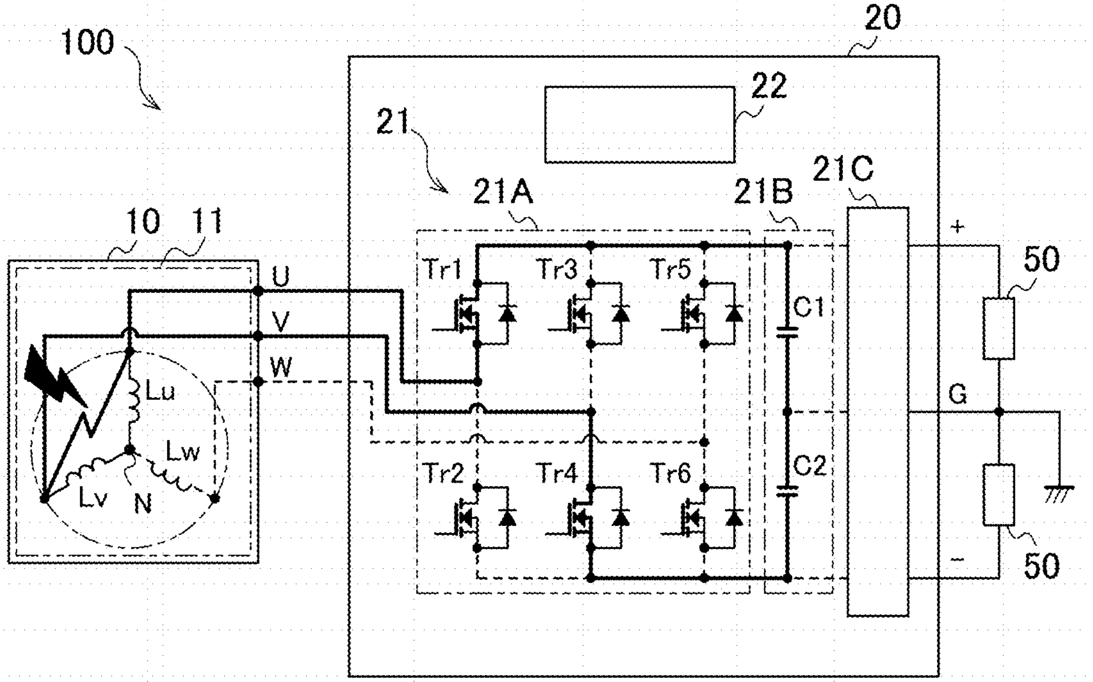
FIG. 3A is a diagram showing an example of a phase-to-phase short circuit in the power generation device shown in FIG. 1.
Figure 3B:
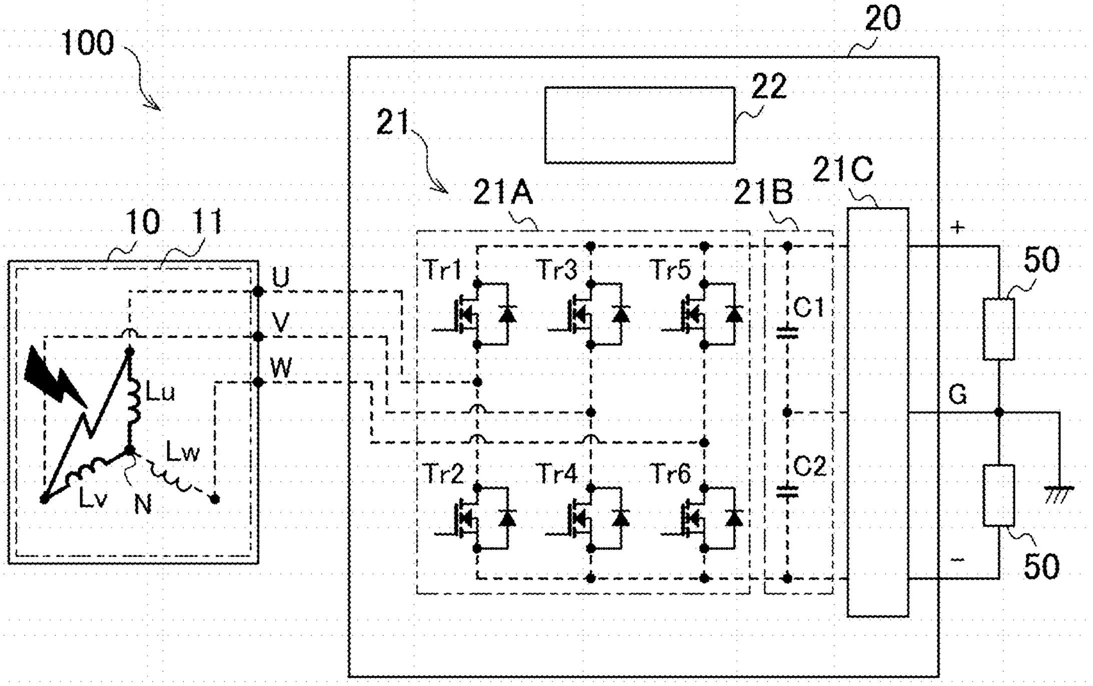
FIG. 3B is a diagram showing an example of a phase-to-phase short in the power generation device shown in FIG. 1.

FIGS. 3A and 3B are diagrams showing examples of a phase-to-phase short circuit in the power generation device 100 shown in FIG. 1. The phase-to-phase short circuit in the power generator 10 is a short circuit that occurs between conductive paths of different phases. FIGS. 3A and 3B show, as the example, a short circuit that occurs between a U-phase conductive path (e.g., the coil Lu) and a V-phase conductive path (e.g., the coil Lv). As shown in FIG. 3A, when the phase-to-phase short circuit occurs, a closed circuit, which starts from the short-circuit location and returns to the same via the switching elements (e.g., Tr1 and Tr4) that are ON when the short circuit occurs and the capacitors C1 and C2, is formed. Since the impedance of the closed circuit is approximately zero, a large DC current flows instantaneously from the capacitors C1 and C2. Therefore, there is a possibility that circuit components on the closed circuit are burned.

In addition, as shown in FIG. 3B, a closed circuit via a neutral point N is also formed. Since the rotation of the rotor does not stop and the current continues to flow as long as the short circuit continues, there is a possibility that the heating progresses at the short-circuit location.

(Grounding Fault)

Figure 4:
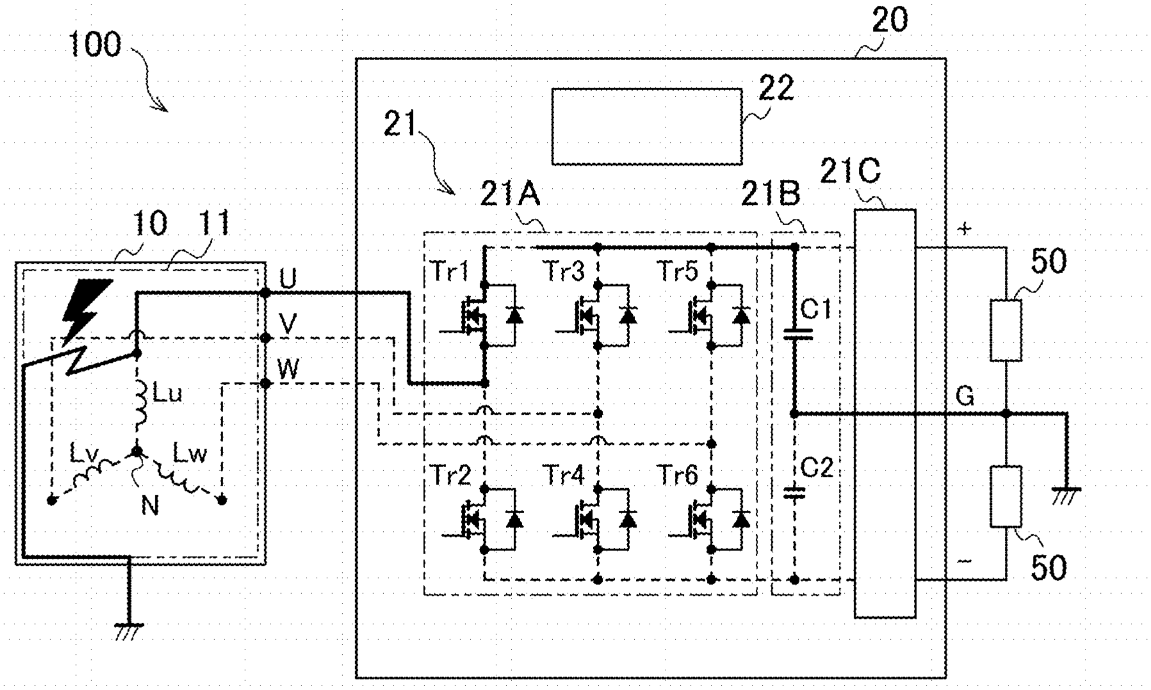
FIG. 4 is a diagram showing an example of a grounding fault in the power generation device shown in FIG. 1.

FIG. 4 is a diagram showing an example of a grounding fault in the power generation device 100 shown in FIG. 1. The grounding fault in the power generator 10 is a short circuit that occurs between the coil of one phase and the ground. FIG. 4 shows, as the example, a short circuit that occurs between the conductive path (e.g., the coil Lu) of the U-phase and the stator 11 of the power generator 10. As shown in FIG. 4, when the grounding fault occurs, a closed circuit, which starts from the short-circuit location and returns to the same via the switching element (e.g., Tr1) that is ON when the short circuit occurs, the capacitor C1, the ground terminal G of the filter circuit, and the stator 11, is formed. Since the impedance of the closed circuit is approximately zero, a large DC current flows instantaneously from the capacitor C1. Therefore, there is a possibility that the circuit components on the closed circuit are burned.

Figure 5:
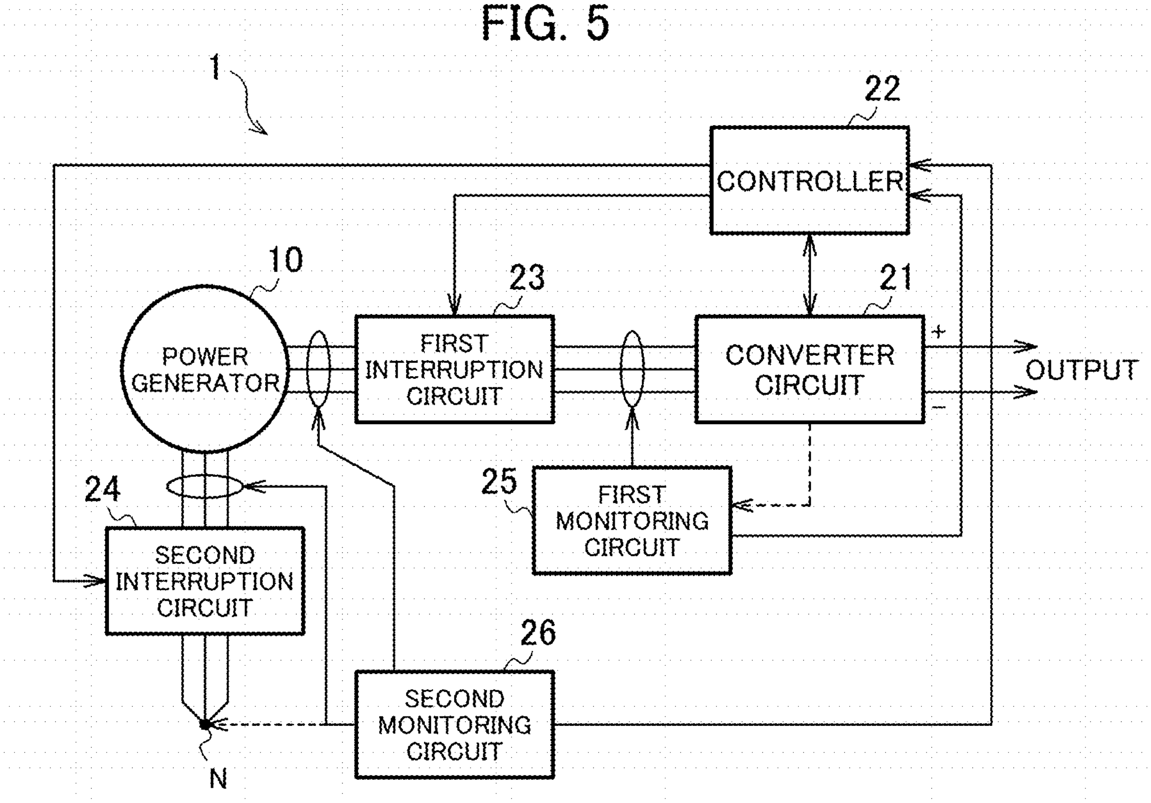
FIG. 5 is a functional block diagram of the power generation device according to an embodiment of the present disclosure.

Next, the power generation device 1 according to the present embodiment will be described. FIG. 5 is a functional block diagram of the power generation device 1 according to the present embodiment. As shown in this figure, the power generation device 1 includes protection circuits against the short circuit in addition to the configuration of the power generation device 100 described above. That is, the power generation device 1 includes a first interruption circuit 23, a second interruption circuit 24, a first monitoring circuit 25, and a second monitoring circuit 26 as the protection circuits, in addition to the power generator 10 and the power conversion circuit 21. As will be understood from the operations described later, the first monitoring circuit 25 is a circuit which detects the phase-to-phase short circuit and the grounding fault in the power generator 10, and the second monitoring circuit 26 is a circuit which detects the interturn short circuit in the power generator 10.

The first interruption circuit 23 is provided between the output of the power generator 10 and the input of the power conversion circuit 21. The first interruption circuit 23 receives a control signal from the controller 22 and electrically interrupts the electrical connection between the power generator 10 and the power conversion circuit 21. The control signal is output from the controller 22 in accordance with the output of the first interruption signal output from the first monitoring circuit 25 or the output of the second interruption signal output from the second monitoring circuit 26. Alternatively, the first interruption signal or the second interruption signal itself may function as the control signal. The first interruption circuit 23 includes a semiconductor switch S1 provided in the U-phase, a semiconductor switch S2 provided in the V-phase, and a semiconductor switch S3 provided in the W-phase. The semiconductor switches S1 to S3 are power semiconductors such as bidirectional thyristors, MOSFETS, IGBTs, or the like.

The second interruption circuit 24 is provided between each of the coils Lu, Lv, and Lw as the three-phase coils and the neutral point N. The second interruption circuit 24 receives a control signal from the controller 22 and electrically interrupts the electrical connection between the three-phase coils and the power conversion circuit 21. This control signal is output from the controller 22 in accordance with the output of the first interruption signal output from the first monitoring circuit 25 or the output of the second interruption signal output from the second monitoring circuit 26. Alternatively, the first interruption signal or the second interruption signal itself may function as the control signal. Similar to the first interruption circuit 23, the second interruption circuit 24 includes a semiconductor switch S4 provided in the U-phase, a semiconductor switch S5 provided in the V-phase, and a semiconductor switch S6 provided in the W-phase. The semiconductor switches S4 to S6 are power semiconductors such as bidirectional thyristors, MOSFETS, IGBTs, or the like.

Figure 6:
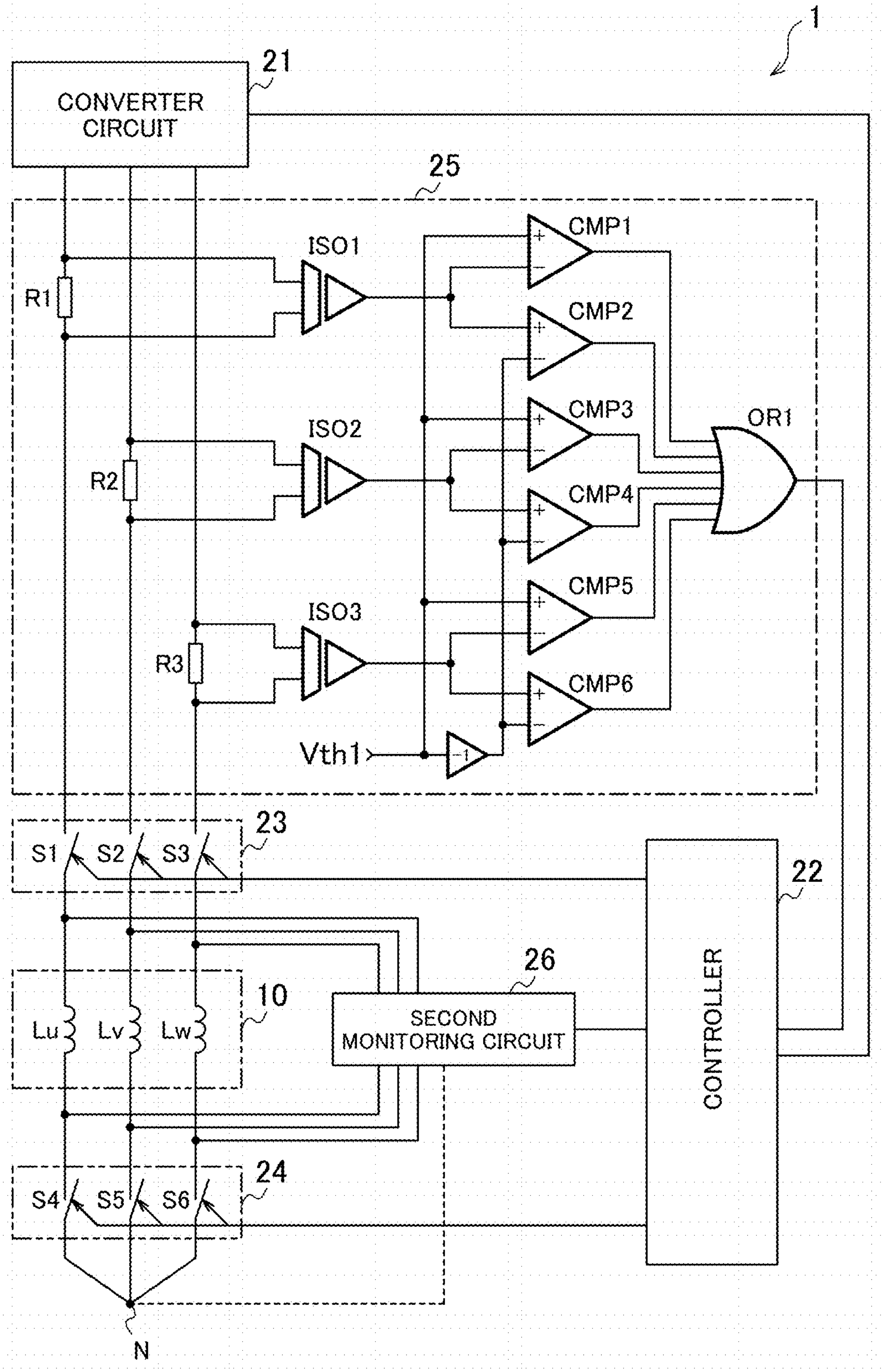
FIG. 6 is a circuit diagram showing an example of a first monitoring circuit according to an embodiment of the present disclosure.

FIG. 6 is a circuit diagram showing an example of the first monitoring circuit 25. As shown in this figure, the first monitoring circuit 25 includes shunt resistors R1 to R3, isolation amplifiers ISO1 to ISO3, comparators CMP1 to CMP6, and an OR circuit OR1. The shunt resistors R1 to R3 operate (function) as current sensors provided between the output of the power generator 10 and the input of the power conversion circuit 21. The first monitoring circuit 25 monitors the output current flowing from the power generator 10 to the power conversion circuit 21, and outputs the first interruption signal when the absolute value of the output current exceeds a first predetermined value. The first predetermined value is set by the controller 22 in consideration of variations such as the rotational speed of the power generator 10 and noise, and is output as the threshold voltage Vth1.

The first monitoring circuit 25 monitors the voltage corresponding to the output current obtained by the current sensor. For example, the first monitoring circuit 25 monitors the voltage of the shunt resistor R1 (R2, R3) inserted between the output of the power generator 10 and the input of the power conversion circuit 21, as monitoring the output current flowing from the power generator 10 to the power conversion circuit 21.

The shunt resistor R1 is provided on the output path of the U-phase connecting the coil Lu and the power conversion circuit 21. The inputs of the isolation amplifier ISO1 are connected to respective ends of the shunt resistor R1. The isolation amplifier ISO1 detects the voltage of the shunt resistor R1 and outputs the voltage of the measured value to the input (−) of the comparator CMP1 and the input (+) of the comparator CMP2. On the other hand, the threshold voltage Vth1, which is the first predetermined value, is applied to the input (+) of the comparator CMP1. Further, an inverted voltage of the threshold voltage Vth1 is applied to the input (−) of the comparator CMP2. Therefore, when the current value of the shunt resistor R1 exceeds the absolute value of the current value corresponding to the threshold voltage Vth1, either of the comparator CMP1 or the comparator CMP2 outputs an output signal at a level indicating this excess to the OR circuit OR1.

The shunt resistor R2 is provided on the output path of the V-phase connecting the coil Lv and the power conversion circuit 21. The inputs of the isolation amplifier ISO2 are connected to respective ends of the shunt resistor R2. The isolation amplifier ISO2 detects the voltage of the shunt resistor R2 and outputs the voltage of the measured value to the input (−) of the comparator CMP3 and the input (+) of the comparator CMP4. On the other hand, the threshold voltage Vth1, which is the first predetermined value, is applied to the input (+) of the comparator CMP3. Further, the inverted voltage of the threshold voltage Vth1 is applied to the input (−) of the comparator CMP4. Therefore, when the current value of the shunt resistor R2 exceeds the absolute value of the current value corresponding to the threshold voltage Vth1, either of the comparator CMP3 or the comparator CMP4 outputs an output signal at a level indicating this excess to the OR circuit OR1.

The shunt resistor R3 is provided on the output path of the W-phase connecting the coil Lw and the power conversion circuit 21. The inputs of the isolation amplifier ISO3 are connected to respective ends of the shunt resistor R3. The isolation amplifier ISO3 detects the voltage of the shunt resistor R3 and outputs the voltage of the measured value to the input (−) of the comparator CMP5 and the input (+) of the comparator CMP6. On the other hand, the threshold voltage Vth1, which is the first predetermined value, is applied to the input (+) of the comparator CMP5. Further, the inverted voltage of the threshold voltage Vth1 is applied to the input (−) of the comparator CMP6. Therefore, when the current value of the shunt resistor R3 exceeds the absolute value of the current value corresponding to the threshold voltage Vth1, either of the comparator CMP5 and the comparator CMP6 outputs an output signal at a level indicating this excess to the OR circuit OR1.

The outputs of the comparators CMP1 to CMP6 are connected to the inputs of the OR circuit OR1. Therefore, when the current value of either of the shunt resistors R1 to R3 exceeds the absolute value of the current value corresponding to the threshold voltage Vth1, the OR circuit OR1 outputs a signal at a level indicating this excess to the controller 22 as the first interruption signal. The controller 22 receives the first interruption signal from the OR circuit OR1, and outputs a control signal for interrupting the circuits to each of the first interruption circuit 23 and the second interruption circuit 24.

The current sensor provided between the output of the power generator 10 and the input of the power conversion circuit 21 is not limited to the shunt resistor described above. That is, the current sensor may be a magnetic sensor such as a Hall sensor. In either case, a voltage proportional to the current flowing between the power generator 10 and the power conversion circuit 21 can be obtained.

Figure 7:
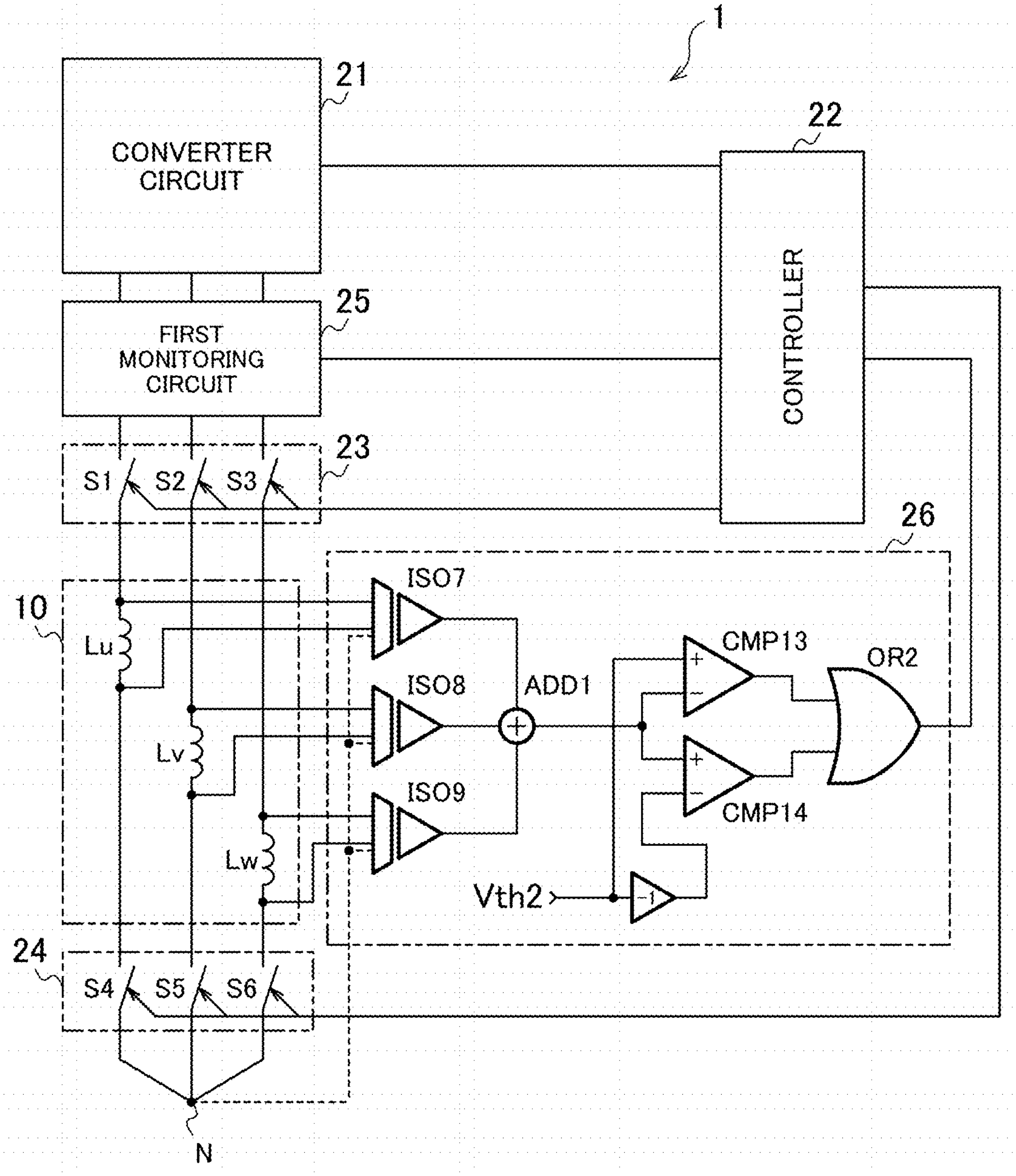
FIG. 7 is a circuit diagram showing an example of a second monitoring circuit according to an embodiment of the present disclosure.

FIG. 7 is a circuit diagram showing an example of the second monitoring circuit 26 according to the present embodiment. As shown in this figure, the second monitoring circuit 26 includes isolation amplifiers ISO7 to ISO9, comparators CMP13 and 14, and an OR circuit OR2. The second monitoring circuit 26 monitors a total value (hereinafter referred to as a total voltage) of the output voltages of the respective phases of the power generator 10. The second monitoring circuit 26 outputs a second interruption signal when the absolute value of the total voltage exceeds a second predetermined value. The second predetermined value is set by the controller 22 in consideration of variations such as noise, and is output as the threshold voltage Vth2.

As the voltage measurement of the respective phases, the second monitoring circuit 26 monitors, for example, the voltages between both ends (i.e., an output end and a neutral-point end) of the respective coils Lu (Lv, Lw) constituting the three-phase coils. The output end of the coil, which is one of the both ends of the coil, substantially functions as the output terminal of the power generator 10. The neutral-point end of the coil, which is the other of the both ends of the coil, is connected to the neutral point N via the second interruption circuit 24.

The isolation amplifier ISO7 detects the voltage between the both ends of the coil Lu and outputs the voltage of the measured value to an adder ADD1. If the voltage of the coil Lu is excessive, the voltage can be set to an appropriate voltage by a voltage dividing circuit (not shown) using resistors.

The isolation amplifier ISO8 detects the voltage between the both ends of the coil Lv and outputs the voltage of the measured value to the adder ADD1. If the voltage of the coil Lv is excessive, the voltage can be set to an appropriate voltage by a voltage dividing circuit (not shown) using resistors.

The isolation amplifier ISO9 detects the voltage between the both ends of the coil Lw and outputs the voltage of the measured value to the adder ADD1. If the voltage across the coil Lw is excessive, the voltage can be set to an appropriate voltage by a voltage dividing circuit (not shown) using resistors.

The adder ADD1 calculates a sum of the voltages output from the isolation amplifiers ISO7 to ISO9 and outputs the sum to the input (−) of the comparator CMP13 and the input (+) of the comparator CMP14. On the other hand, the threshold voltage Vth2 which is the second predetermined value is applied to the input (+) of the comparator CMP13. An inverted voltage of the threshold voltage Vth2 is applied to the input (−) of the comparator CMP14.

When the output voltage of the adder ADD1 exceeds the absolute value of the threshold voltage Vth2, either of the comparator CMP13 or the comparator CMP14 outputs an output signal at a level indicating this excess to the OR circuit OR2.

The voltage generated by the power generator 10 is a pseudo three-phase sinusoidal alternating current using PWM (pulse width modulation). If the ripple caused by PWM is not taken into account, the voltages of the phases change in the same waveform with a phase difference of 120°. Therefore, when the power generator 10 is normally operated, the sum of the voltages of the phases is zero in principle. Therefore, the sum of the voltages appearing in the coils Lu, Lv, and Lw, that is, the output voltage of the adder ADD1 is also zero in principle. Conversely, when the current waveform of any of the U, V, and W phases is disturbed and the current balance is lost, the sum of the voltages appearing in the coils Lu, Lv, and Lw changes from zero. Therefore, the threshold voltage Vth2 is set to, for example, the maximum value of a variation such as a supposed ripple or the like.

The outputs of the comparators CMP13 and 14 are connected to the inputs of the OR circuit OR2. Therefore, when the output voltage of the adder ADD1 exceeds the absolute value of the threshold voltage Vth2, the OR circuit OR2 outputs a signal at a level indicating this excess to the controller 22 as the second interruption signal. The controller 22 receives the second interruption signal from the OR circuit OR2, and outputs a control signal for interrupting the circuit to each of the first interruption circuit 23 and the second interruption circuit 24.

As shown by the broken lines in FIG. 7, the second monitoring circuit 26 may measure the voltage between the output end of the coil Lu (Lv, Lw) and the neutral point N, instead of measuring the voltage between both ends of the coil Lu (Lv, Lw).

(Interruption Operation in Interturn Short Circuit)

When the interturn short circuit occurs in the power generation device 1 according to the present embodiment, the output voltage of the phase in which the interturn short circuit occurs decreases. That is, the voltage of the phase in which the short circuit has occurred are lower than the voltages of the phases in which the short circuit has not occurred.

As described above, the second monitoring circuit 26 monitors the total value of the output voltages of the respective phases of the power generator 10. When the interturn short circuit occurs, the voltage of any of the coils Lu, Lv, and Lw decreases, so that the total value of the output voltages of the respective phases increases or decreases from zero. When an absolute value of this fluctuation value exceeds the threshold voltage Vth2, the OR circuit OR2 outputs the second interruption signal to the controller 22.

The controller 22 receives the second interruption signal from the OR circuit OR2, and outputs a control signal for interrupting the circuits to each of the first interruption circuit 23 and the second interruption circuit 24. The first interruption circuit 23 turns off the semiconductor switches S1 to S3 upon receiving the control signal from the controller 22. Similarly, the second interruption circuit 24 turns off the semiconductor switches S4 to S6 upon receiving the control signal from the controller 22. Accordingly, the electrical connection between the power generator 10 and the power conversion circuit 21 is quickly and completely interrupted, and thus it is possible to prevent damage to the power generation device 1 due to overcurrent from progressing.

(Interruption Operation in Phase-to-Phase Short Circuit or Grounding Fault)

When the phase short circuit or grounding fault occurs in the power generation device 1 according to the present embodiment, the output current of the phase in which the phase short circuit or grounding fault occurs increases. Specifically, the current of the phase in which the short circuit occurs increases more than the current of the phase in which the short circuit does not occur. With this increase in the output current, the voltage of the shunt resistor provided in the phase in which the short circuit occurs also increases.

As described above, the first monitoring circuit 25 monitors the output currents flowing from the power generator 10 to the power conversion circuit 21 using the voltages of the shunt resistors R1 to R3. When the phase-to-phase short circuit occurs, the voltage of any of the shunt resistors R1 to R3 increases. When this fluctuation value exceeds the threshold voltage Vth1, the OR circuit OR1 outputs the first interruption signal to the controller 22.

The controller 22 receives the first interruption signal from the OR circuit OR1, and outputs a control signal for interrupting the circuits to each of the first interruption circuit 23 and the second interruption circuit 24. The first interruption circuit 23 receives the control signal from the controller 22 and turns off the semiconductor switches S1 to S3. Similarly, the second interruption circuit 24 receives the control signal from the controller 22 and turns off the semiconductor switches S4 to S6. Accordingly, the electrical connection between the power generator 10 and the power conversion circuit 21 is quickly and completely interrupted, and thus it is possible to prevent damage to the power generation device 1 due to overcurrent from progressing.

The power generation device 1 according to the present embodiment is applicable even in an environment where the rotation of the rotor cannot be stopped immediately, in other words, power generation cannot be stopped immediately. The power generator installed in such an environment is an aircraft power generator, for example. While the power generator installed on the aircraft employs a Wound Field Synchronous Generator (WFSG) capable of stopping magnetic excitation, the aircraft does not have a mechanism for interrupting a driving force such as a clutch or the like that interrupts the driving force from a turbine, which is a driving source of the power generator. Therefore, the rotor of the power generator continues to rotate while the turbine is rotating. The power generator installed on the aircraft is cooled using a cooling oil. When the power generation device excessively generates heat due to a short circuit or the like in the power generation device, it is necessary to stop the power generation in order to prevent ignition of the power generation device and ignition of the cooling oil.

On the other hand, the power generation device 1 according to the present embodiment does not use a filter element such as an inductor or a filter circuit for detecting an abnormal current. Therefore, the supply of the power can be interrupted in a short time (for example, within 200 μs). Accordingly, the power generation device 1 can be employed under the environment described above.

Modified Example

Figure 8:
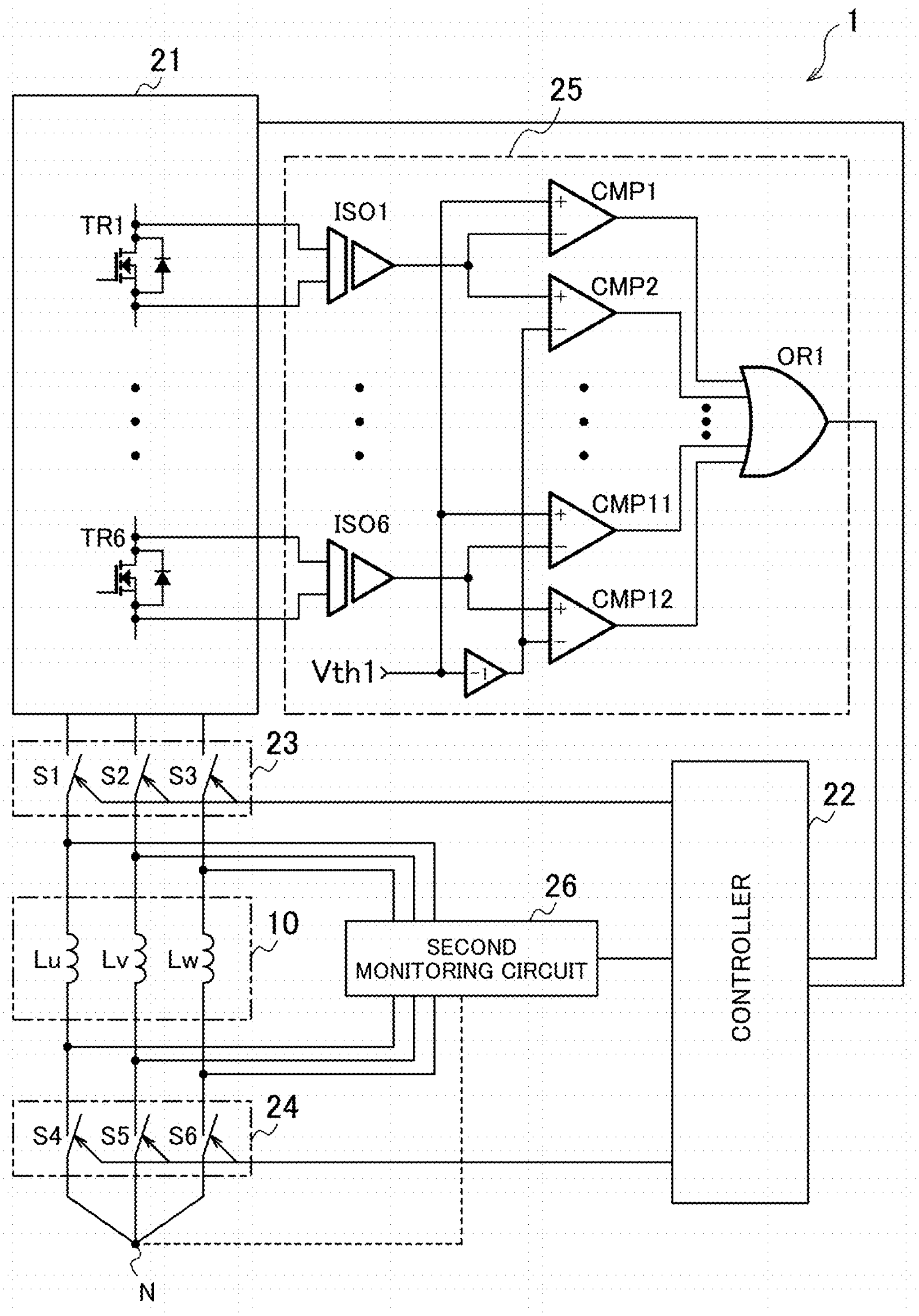
FIG. 8 is a circuit diagram showing another example of a first monitoring circuit according to an embodiment of the present disclosure.

FIG. 8 is a circuit diagram showing another example of the first monitoring circuit 25 according to the present embodiment. As shown in this figure, the first monitoring circuit 25 may monitor a voltage of each of the pair of switching elements as monitoring the output current flowing from the power generator 10 to the power conversion circuit 21. That is, the first monitoring circuit 25 may monitor a voltage between two terminals of each of all the switching elements Tr1 to Tr6 through which the aforementioned output current passes. The circuit configuration from the detection of each voltage to the OR circuit through the isolation amplifier and comparator is the same as that shown in FIG. 6. In this modification, the shunt resistors R1 to R3 can be omitted. Therefore, more rapid interruption operation is possible.

The power generator 10 according to the present embodiment is not limited to a permanent magnet synchronous generator, but may be another type of power generator. The protection of the power generator according to the present embodiment works more effectively for a power generator in which power generation by rotation of the rotor cannot be stopped when an abnormality occurs in the power generator. However, it is possible to protect a power generator equipped with another power generator such as an electromagnet synchronous generator.

The present disclosure is not limited to the above-described embodiments, but is indicated by the statement of the claims, and further includes all changes within the meaning and scope of the statement of the claims.

What is claimed is:

1. A power generation device comprising:

a power generator provided with a stator including three-phase coils;

a power conversion circuit configured to convert an AC power output from the power generator into a DC power;

a first interruption circuit provided between an output of the power generator and an input of the power conversion circuit;

a second interruption circuit provided between the three-phase coils and a neutral point;

a first monitoring circuit configured to monitor an output current flowing from the power generator to the power conversion circuit and output a first interruption signal when an absolute value of the output current exceeds a first predetermined value; and a second monitoring circuit configured to monitor a total value of output voltages of respective phases of the power generator and outputting a second interruption signal when an absolute value of the total value exceeds a second predetermined value; wherein the first interruption circuit electrically interrupts a connection between the power generator and the power conversion circuit in accordance with an output of the first interruption signal or the second interruption signal;

the second interruption circuit electrically interrupts a connection between the three-phase coils and the neutral point in accordance with the output of the first interruption signal or the second interruption signal.

2. The power generation device according to claim 1, wherein the first monitoring circuit is configured to monitor a voltage corresponding to the output current obtained by a current sensor provided between an output of the power generator and an input of the power conversion circuit as monitoring the output current.

3. The power generation device according to claim 1, wherein the power conversion circuit includes a pair of switching elements functioning as rectifying elements in each phase; and the first monitoring circuit is configured to monitor a voltage of each of the pair of switching elements as monitoring the output current.

4. The power generation device according to claim 1, wherein the power generator is a permanent magnet synchronous generator.

* * * * *